Aug. 18, 1959 L. I. ALGASE 2,900,634

DUPLEX OPERATION USING ALTERNATELY KEYED DISTRIBUTED AMPLIFIERS

Filed Oct. 9, 1957

INVENTOR
LAWRENCE I. ALGASE
BY Frank E. Ward
ATTORNEY

United States Patent Office 2,900,634

Patented Aug. 18, 1959

2,900,634

DUPLEX OPERATION USING ALTERNATELY KEYED DISTRIBUTED AMPLIFIERS

Lawrence I. Algase, Bethpage, N.Y., assignor to Instruments for Industry, Incorporated, Mineola, N.Y., a corporation of New York Application October 9, 1957, Serial No. 689,178

6 Claims. (Cl. 343—178)

Figure 1:
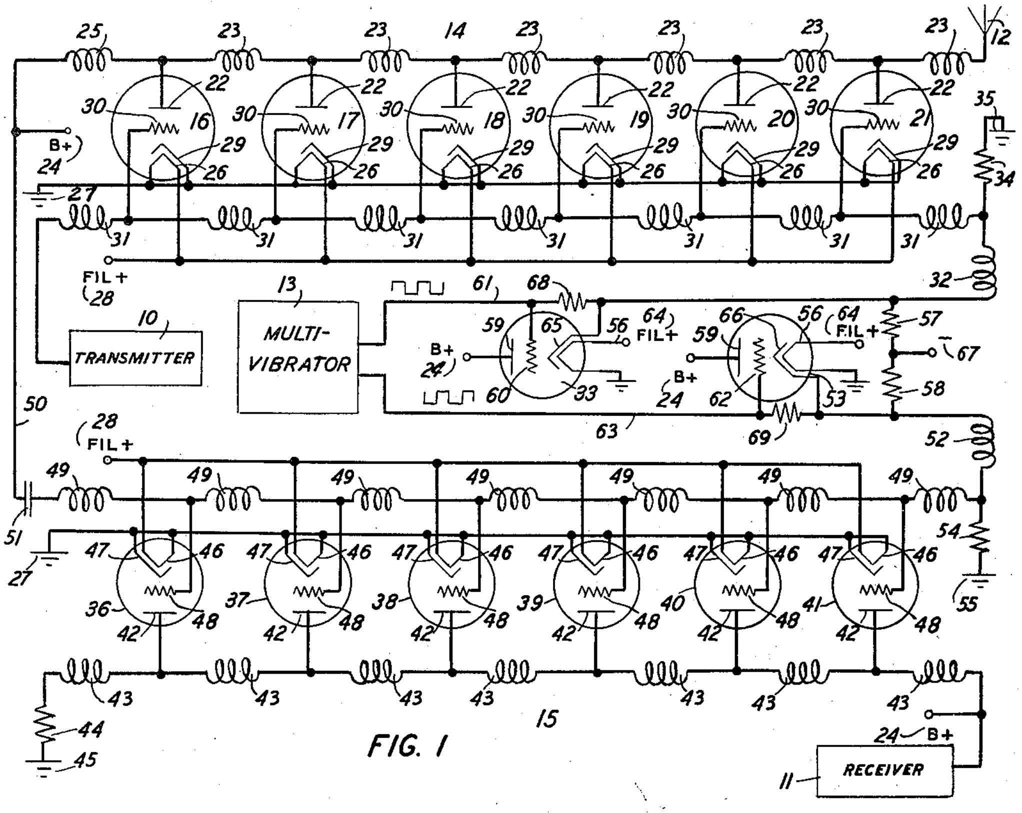

This invention relates to ultra high frequency transmission systems and more particularly to broad band duplex radio communication systems.

The main object of this invention is to facilitate the transmission and reception of broad band ultra high frequencies over a common antenna without undue interference or damage to the receiver system during the operation of the transmitter.

Another object of the invention is to attain the above facilities without the necessity of switches, filters or tuned circuits.

A further object of the invention is to efficiently couple a broad band distributed amplifier between the receiver and the antenna while a high power broad band distributed amplifier is connected between the transmitter and the antenna.

These objects are attained in accordance with this invention, by coupling the antenna directly to the output end of the plate line of the high power distributed amplifier which is connected through its input circuit to an ultra high frequency transmitter while said antenna is also directly coupled to the input circuit of a distributed preamplifier which is joined, through its plate line, to a radio receiver. Both the receiver and the transmitter are alternately placed in operation through an electronic switch arrangement for the distribution of ultra high frequency broad band signal energy in the transmission system.

The problem with the present system of duplex operation is during transmission when the high power and available current in each stage or tube in the high power distributed power amplifier splits, half flowing toward the output and the other half toward the reverse termination at the end of the preamplifier of the receiver, which incidently acts as a passive filter during transmission. It is obvious that this reverse current, due to its high level, could be dangerous to the tubes in the preamplifier and do considerable damage to the receiver, due to the extremely high voltages extant within the system.

One of the features of this invention is to control the distribution of energy in the system, so that no harmful effects are experienced in the operation of the system.

Another feature of the invention is to efficiently distribute and dissipate the reverse energy so that the level of the voltage will be materially reduced and, therefore, the damaging effect of the voltage efficiently eliminated.

Still a further feature of the invention is to produce a reduction of the grid voltage in the preamplifier circuit of the receiver system, as a function of normalized frequency, $X_k$, where the ratio of the voltage at the receiver to that at the antenna, during transmission, depends on the number of stages or sections which are used in the preamplifier circuit, and is limited in a region between 0.1 $X_k$ to 0.9 $X_k$ to less than 25%. Therefore, the receiver circuit will be protected against abnormal or excessive voltages which might endanger the efficient operation of the system.

Figure 2:
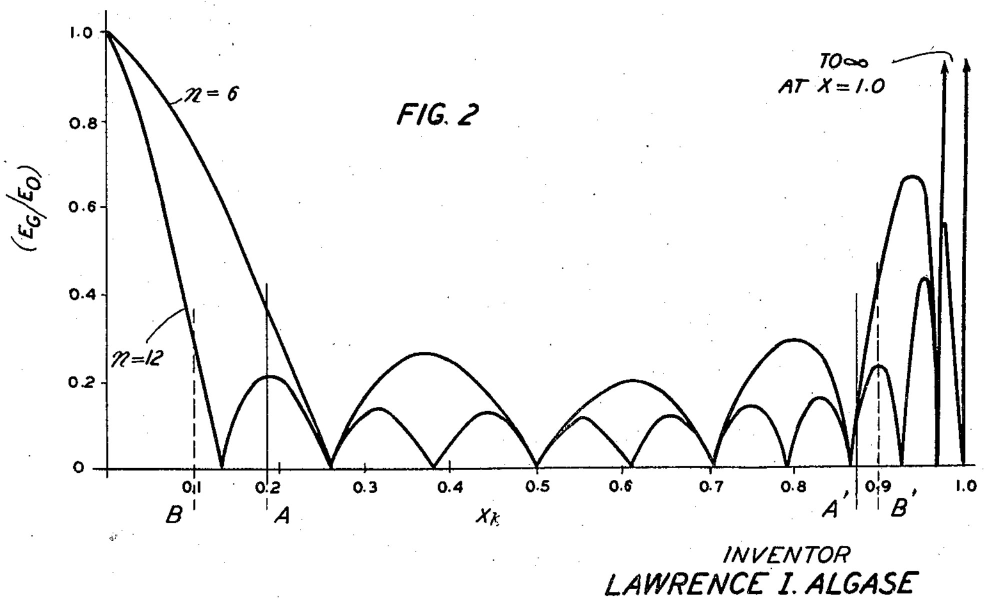

These and other features and advantages of the invention will be more clearly understood from the following detailed description when considered with the accompanying drawings, in which:

Fig. 1 is a complete schematic presentation of the duplex system of this invention, wherein broad band distributed amplifiers are employed in the transmitting and receiving circuits, and, Fig. 2 is a graphic representation of the distribution of voltage in the preamplifier circuit for two constant $k$ configurations, to illustrate the technique employed in this invention to safeguard the receiver circuit during the transmitting cycle.

Referring to Fig. 1, of the drawings, the invention is embodied in a duplex radio communication system in which a transmitter 10, and a receiver 11, are coupled to a common antenna 12, the former through a broad band power amplifier 14, and the latter through a broad band preamplifier 15. The two amplifiers are alternately switched on and off by means of a multivibrator switching control 13, which supplies out of phase enabling voltages to them.

The power amplifier 14 is represented as a distributed amplifier which constitutes six (6) stages or sections, 16 to 21 inclusive, connected in parallel, with the plate 22 of each tube connected to the antenna 12, through a series of coupling inductances 23 and connected to the positive terminal of a power source 24, through another inductance 25.

The heater 26, of each tube, is grounded at 27, on one side, while the opposite side is connected to a low voltage source 28. The cathode 29, of each tube, is also grounded at 27. The grid or control electrode 30, of each tube, is coupled through an intermediate inductance 31 to the output of the transmitter 10 and to a radio frequency choke 32, which feeds into a switching tube 33 controlled by the multivibrator 13, the input circuit of the power amplifier 14 being terminated through a terminating resistance 34, to ground 35.

The receiver is likewise coupled to the output of a distributed preamplifier 15, consisting of six (6) tubes 36 to 41 inclusive, connected in parallel, with the plate 42 of each tube connected to the receiver 11, through a series of inductances 43, and to the positive terminal of the power supply 24, the opposite end of the line being terminated by a resistance 44, to ground 45. The heater 46, of each tube, is connected to ground 27 on one side and to a low voltage supply 28 on the other side, while the cathode of each tube is grounded. The grids or input electrodes 48 are connected in parallel through a series of inductances 49, and through the plate line 50 of the power amplifier 14, to the antenna 12. A blocking condenser 51, in the receiver input line blocks the D.C. source 24. At the opposite end of the input circuit of the preamplifier 15, a radio frequency choke coil 52 couples the amplifier to switching tube 53, which is connected to the other side of the multivibrator control 13. The input circuit is connected through a terminating resistance 54, to ground 55.

The heaters 56, of switching tubes 33 and 53, are grounded on one side, while on the other side they are connected to a filament voltage source 64. The cathodes 65 and 66, are returned through resistances 57 and 58 to a negative voltage source 67. The plate 59, of each switching tube, is connected to the positive terminal of the power supply 24. The cathode 65 of switching tube 33 is energized, through coupling resistance 68, by a positive pulse over conductor 61 from multivibrator 13, causing the cathode 65 of switching tube 33 to be at ground potential. Simultaneously, the grid 62 of switching tube 53, which is fed by the opposite phase voltage from multivibrator 13, will be negative, as will its cathode 66. The switching operation is effected by causing the multivibrator 13 to operate in its opposite mode, in which the cathode 65, of switching tube 33, will be negative and the cathode 66, of switching tube 53, will be at ground potential. The grid 62, of switching tube 53, is coupled to the cathode 66 through the resistance 69.

While the invention is presented with the power amplifier 14 and preamplifier 15 involving six (6) tubes each, more improved effects and advantages may be realized when twelve (12) tubes or stages are employed in the broad band distributed amplifiers.

The operation of the duplex arrangement according to the invention, follows: With the transmitter 10 and power amplifier 14 energized, the preamplifier 15, involving grids 48 of tubes 36 to 41 inclusive, is cut off due to a negative voltage on the grid 62 of switching tube 53; and, while amplifier 15 is cut off, a suitable bias voltage is supplied to the grids 30, of the power amplifier tubes, and the output from the power amplifier 14 is radiated by the antenna 12. When the multivibrator 13 generates a positive pulse at the grid 62 of switching tube 53, its cathode 66 is brought to ground potential, causing preamplifier 15 to conduct. Simultaneously, a negative pulse from the multivibrator 13 is applied to the grid 60, of switching tube 33, causing the power amplifier 14 to be cut off, so that only the receiver is operatively coupled to antenna 12, during which time the plate line of the power amplifier 14 acts as a passive filter.

Of course, during reception of signal energy, the power amplifier 14 is not materially affected deleteriously because of the low voltage involved in the operation of the receiver 11. However, due to the higher voltages employed in the operation of the transmitter 10 and the associated power amplifier 14, the tubes 36 to 41, inclusive, in the preamplifier 15, may be seriously damaged by the flow of current toward the reverse termination 54, since the preamplifier 15 is included in the antenna circuit through the input line in series with the termination 54.

Basically, the technique employed in this invention, is a means of joining the output of a broad band transmitter and the input of a broad band receiver to a common antenna, without material damage or danger to the receiver elements while the transmitter is in use for transmitting energy.

Assume that the transmitting stage of the system is a distributed amplifier, the technique of coupling the antenna directly to the output end of the plate line and the reverse termination to the reverse end of the plate line through the grid line of the receiving distributed amplifier has been in general use in the electronic art. By means of this technique incoming signals are coupled to the receiving amplifier through the plate line of the transmitting power amplifier stage, which acts as a passive filter when the transmitting stage is inactive or cut off. The problem arises during transmission of energy by the transmitter to the antenna 12. Then the available current from each tube, namely 16 to 21 inclusive, splits, half flowing towards the antenna 12, while the other half flows toward the reverse termination 54, through conductor 50 and the input circuit of tubes 36 to 41 inclusive, of the preamplifier 15. Conceivably, this reverse current could cause extremely high voltages to exist in the receiving circuit with harmful effects to the tubes in the preamplifier 15. The purpose of this disclosure is to present methods and processes with the means whereby these effects may be materially avoided.

Under normal circumstances the signal current flowing in the plate circuit of any distributed amplifier is proportional to;

$$g_m\, e_{go}(1-X_k^2)^{1/2}$$

where $g_m$ is the transconductance of the tube;

$e_{go}$ is the voltage at the grid of each tube at zero frequency; and $X_k$ is a normalized frequency function equal to the ratio of actual frequency to the cut-off frequency of the grid line. (In this analysis a low-pass constant $k$ amplifier is assumed. Equivalent analysis is possible for a band-pass distributed amplifier.)

However, since the stage in question is a transmitting stage, it will be assumed that it is operating at saturation and there will be no increase in plate current as the grid voltage increases toward cut-off. Therefore, the plate current will be assumed to be constant and equal to $g_m\, e_{go}$ and the current flowing toward the reverse termination in each tube will be $(g_m\, e_{go})/2$.

To find the current flowing into the reverse termination, let us assume a phase shift $\phi$ between adjacent grids and between adjacent plates of the tubes in the power amplifier 14. The total current at the first plate, $I_0$, is therefore;

$$I_0=\sum_{k=0}^{n-1}(g_m e_{go}/2)e^{-i2k\phi} \quad (1)$$

multiplying by $e^{-i2\phi}$ $$I_0 e^{-i2\phi}=\sum_{k=0}^{n-1}(g_m e_{go}/2)(e^{-i2\phi(k+1)}) \quad (2)$$

subtracting 1 from 2

$$I_0(1-e^{-i2\phi})=(g_m e_{go}/2)(1-e^{-2n\phi})$$

therefore $$I_0=(g_m e_{go}/2)\frac{(1-e^{-i2n\phi})}{(1-e^{-i2\phi})}$$

$$=(g_m e_{go}/2)\frac{e^{-in\phi}}{e^{-i\phi}}\,\frac{e^{-in\phi}e^{-in\phi}}{e^{-i\phi}e^{-i\phi}}$$

$$=(g_m e_{go}/2)e^{i(n-1)\phi}\frac{\text{Sin } n\phi}{\text{Sin } \phi}$$

If it is assumed that the preamplifier is a distributed amplifier, such as preamplifier 15, the characteristic impedance of which is equal to the characteristic impedance of the plate line of the power amplifier 14, the voltage developed at the grid of each tube 36 to 41 inclusive, of the preamplifier 15, $e_{gp}$ is given by;

$$e_{gp}=\frac{R_o}{\sqrt{1-X_k^2}}(g_m e_{go}/2)e^{i(n-1)}\frac{\text{Sin } n\phi}{\text{Sin } \phi}$$

The magnitude of the grid voltage is;

$$|e_{gp}|=\frac{R_o}{\sqrt{1-X_k^2}}(g_m e_{go}/2)\frac{\text{Sin } n\phi}{\text{Sin } \phi}$$

The magnitude of the output voltage at the antenna, $e_o$, of the distributed amplifier 14, at midband if it is a band pass circuit, and at the low end if it is a low pass circuit is;

$$|e_o|=\left|\frac{n g_m e_{go}}{2}R_o\right|$$

Therefore, the ratio $e_{gp}/e_o$ gives the reduction of voltage across the grids 48 of the tubes 36 to 41 inclusive, in the preamplifier 15, with respect to the voltage at the antenna, if the described configuration is employed.

$$\left|\frac{e_{gp}}{e_o}\right|=\frac{\text{Sin } n\phi}{\sqrt{1-X_k^2}\,n \text{ Sin } \phi}$$

This expression is plotted in Fig. 2, for two low pass constant $k$ configurations, one with six (6) sections and the other with twelve (12) sections. For the constant $k$ configuration $\phi=2$ arc sin $Xk$. For the former it is apparent that if the band is limited to the region A—A[1], namely; from $0.2<Xk$ to $<0.89$, the voltage across any grid in the preamplifier will be less than approximately 30% of the output voltage. If twelve (12) sections or stages are used, the frequency region indicated by B—B[1], represents the voltage, namely, approximately $0.1<Xk$ to $<0.935$, across any grid 48, in the preamplifier 15, and will always be less than 25% of the output voltage.

The above results are attained by limiting or controlling the reverse voltage flowing toward the reverse termination 54, when the high voltage source feeding the transmitter is flowing in the common conductor coupling the transmitter and the receiver to the common antenna 12. As the output current in the power amplifier 14 flows toward the antenna 12, the current in each plate circuit 22, of each tube 16 to 21 inclusive, splits, half going to the antenna circuit and half along conductor 50 toward the reverse termination network 54.

In its travel toward ground 55, the reverse voltage leads to the input circuit or the grids 48, of tubes 36 to 41 inclusive, in the preamplifier 15. If the same amount of voltage appears in the input circuit of preamplifier 15 as is supplied to the antenna 12, via the power amplifier 14, it is evident that considerable damage would be inflicted on the tubes in the preamplifier and other components therein. Obviously, in order to take advantage of the direct coupling of the transmitter and the receiver to a common antenna without separate switches, filters, tuned circuits or other segregating networks, it is essential that the tubes in the preamplifier 15 are protected against damage from the high transmitting potentials to which the tubes in the preamplifier are vulnerable.

In accordance with this invention, as indicated in the mathematical analysis, as explained above, the phase shift of the current in the plate 22, of each tube 16 to 21 inclusive, of the transmitter power amplifier 14, as it splits in the output circuit, causes a portion of the energizing voltage to be reduced by vectorial projection as it flows toward the input circuit of the preamplifier 15, whereby the ratio;

$$|e_{gp}/e_o|=\frac{\text{Sin } n\phi}{\sqrt{1-X_k n}\ \sin\phi}$$

and where $\phi=2$ arc sin $Xk$. Therefore, if twelve stages are employed in the distributed amplifier 14, the normalized frequency region will be held within a range of 0.1 to 0.935 and the voltage appearing at any one grid 48 of the preamplifier will be approximately 25% of the output voltage in the transmitter circuit, which represents a safe reduction which cannot damage the tubes 36 to 41 inclusive, in the preamplifier. If six stages are employed in the preamplifier, as shown in the drawings, the ratio of reduction in voltage will be in the region from 0.2 to 0.89, and the voltage across any grid in the preamplifier will not exceed 30% of the output voltage.

While the above discussion represents a preferable and specific means of arriving at the results of this invention, to achieve satisfactory duplex operation of the transmitting and receiving equipment employing a single or common antenna, it is, of course, understood, that various other arrangements and applications may be devised within the scope of this invention without departing from the broad intent thereof as defined in the appended claims.

What is claimed is:

1. A duplex radio signalling system, comprising a transmitter, a receiver, a common antenna, a multi-stage broad band distributed power amplifier interposed between said transmitter and said antenna, a multi-stage broad band distributed preamplifier, means connecting said receiver and preamplifier in series with the output circuit of said power amplifier to said antenna, and means for alternately energizing said power amplifier and said preamplifier, said power amplifier having a limitation of the ratio of voltage at said preamplifier to that at said antenna, being over a large portion of a normalized frequency function equal to the ratio of actual frequency to the cut-off frequency of said power amplifier during transmission of signal without voltage reduction being incurred during signal reception.

2. A duplex radio signalling system, comprising a transmitter, a receiver, a common antenna, a six stage broad band low pass constant $k$ distributed power amplifier interposed between said transmitter and said antenna, a six stage broad band low pass constant $k$ distributed preamplifier, means connecting said receiver and preamplifier in series with the output circuit of said power amplifier to said antenna, and a multivibrator control circuit alternately energizing said power amplifier and said preamplifier to alternately couple the transmitter and receiver to said antenna, said power amplifier having a limitation of the ratio of voltage at the preamplifier to that at said antenna of 30% maximum in the frequency region from 0.2 to 0.8 of a normalized frequency function, equal to the ratio of actual frequency to the cut-off frequency of said power amplifier during transmission of signal without voltage reduction being incurred during signal reception.

3. A duplex radio signalling system, comprising a transmitter, a receiver, a common antenna, a twelve stage broad band low pass constant $k$ distributed power amplifier interposed between said transmitter and said antenna, a twelve stage low pass constant $k$ distributed preamplifier, means connecting said receiver and preamplifier in series with the output circuit of said power amplifier to said antenna, and a multivibrator control circuit alternately energizing said power amplifier and said preamplifier to alternately couple the transmitter and receiver to said antenna, said power amplifier having a limitation of the ratio of voltage at said preamplifier to that at said antenna of 25% maximum in the frequency region of from 0.1 to 0.935 of a normalized function frequency, equal to the ratio of actual frequency to the cut-off frequency of said power amplifier during transmission of signal without voltage reduction being incurred during signal reception.

4. A duplex radio signalling system, comprising a high power transmitter, a receiver, a common antenna, a multi-stage broad band distributed power amplifier having input and output circuits, a multi-stage broad band distributed preamplifier having input and output circuits, a pair of electronic switching tubes, one of each being connected to the input circuit of said power amplifier and said preamplifier, pulsing means coupled to said switching tubes for alternately driving said input circuits to cut-off, said output circuit of said preamplifier being connected to said receiver, the input circuit of said power amplifier being connected to said transmitter, the input circuit of said preamplifier being coupled directly in series with the output circuit of said transmitter and said common antenna, and a reverse termination at the end of said series line of said preamplifier for dissipating the reverse energy flowing through said series line from said transmitter, said input circuit of said preamplifier being protected against damage by the high voltage during transmitter operation, by limiting the flow of reverse voltage to a value of 25% to 30% of the total voltage supplied to said antenna.

5. A radio signalling system comprising a transmitter, a receiver, a common antenna, a multi-stage broad band distributed power amplifier connecting the output circuit of said transmitter to the antenna, thereby to apply outgoing signals to the antenna for radiation into space, a multi-stage broad band distributed preamplifier, the output of said preamplifier being connected to the input of said receiver, circuit means connecting the input circuit of said preamplifier to the output circuit of said power amplifier whereby space signals received by the antenna are applied through the output circuit of said power amplifier and said coupling means in series to the input of said preamplifier and therethrough to said receiver, switching means for separately applying control pulses to the control elements of the power amplifier and the preamplifier, the polarity of the control pulses being alternated whereby these amplifiers are alternately conductive and cut off, each being conductive while the other is cut off, and terminating means connected to the preamplifier input circuit for dissipating high voltage energy transmitted from the output circuit of said power amplifier through said circuit means to the input circuit of said preamplifier, thereby preventing damage to said preamplifier.

6. A radio signalling system comprising a transmitter, a receiver, a common antenna, a multi-stage broad band distributed power amplifier connecting the output circuit of said transmitter to the antenna, thereby to apply outgoing signals to the antenna for radiation into space, a multi-stage broad band distributed preamplifier, the output of said preamplifier being connected to the input of said receiver, coupling means connecting the input circuit of said preamplifier to the output circuit of said power amplifier whereby space signals received by the antenna are applied through the output circuit of said power amplifier and said coupling means in series to the input of said preamplifier and therethrough to said receiver, switching means for separately applying control pulses to the control elements of the power amplifier and the preamplifier, the polarity of the control pulses being alternated whereby these amplifiers are alternately conductive and cut off, each being conductive while the other is cut off, and terminating means connected to the preamplifier input circuit, the maximum voltage applied through said coupling means from the output circuit of said power amplifier to the input circuit of said preamplifier being limited by phase difference between stages of the power amplifier and said voltage being dissipated by said terminating means, the limitation and dissipation of this voltage being effective to prevent damage to the preamplifier.

References Cited in the file of this patent

UNITED STATES PATENTS

| | | |
|---|---|---|
| 2,498,635 | Bailey | Feb. 28, 1950 |
| 2,541,910 | Bangert | Feb. 13, 1951 |
| 2,726,291 | Quate | Dec. 6, 1955 |